E. TERRY.
AUTOMATIC VALVE.
APPLICATION FILED JAN. 22, 1919.

1,346,921. Patented July 20, 1920.

Edward Terry
INVENTOR
by Laurence Langner
Attorney

UNITED STATES PATENT OFFICE.

EDWARD TERRY, OF LONDON, ENGLAND.

AUTOMATIC VALVE.

1,346,921.  Specification of Letters Patent.  Patented July 20, 1920.

Application filed January 22, 1919. Serial No. 272,591.

*To all whom it may concern:*

Be it known that I, EDWARD TERRY, a subject of the King of Great Britain, residing at London, England, have invented new and useful Improvements Relating to Automatic Valves, of which the following is a specification.

This invention relates to automatic valves such as are employed for regulating the flow of liquids or fluids or relieving the pressure thereof.

The chief object of the invention is to provide an improved valve which shall be capable of adjustment within comparatively wide limits to operate automatically at any desired pressure. Further objects are to provide a valve which shall be simple in construction, efficient and certain in action, the parts composing the same not being subject to excessive wear and tear or liable to derangement but being capable of easy replacement in case of need.

According to my invention the device comprises a casing or barrel having a conical valve seating. The valve which is in the form of a truncated cone is formed with a rabbeted or recessed portion for the reception of a ring or band which may be of rubber or other suitable resilient material. The aforesaid rabbeted or recessed portion of the valve is provided with an annular groove at or near the upper end into which the inner face of the resilient ring engages so that a tight seal is obtained when the valve is seated thus preventing air or liquid leaking between the body of the valve and the resilient ring or band a similar groove may also be provided near the lower end of the valve body if necessary.

In order that the invention may be readily understood and carried into effect I will now proceed to describe the same more fully with reference to the accompanying drawing in which:—

Figure 1:
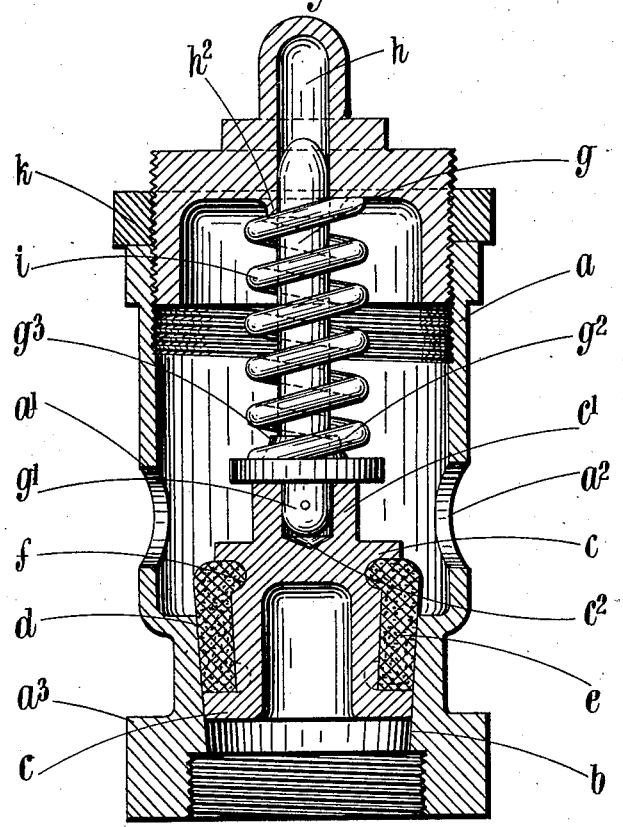
Figure 1 represents a vertical section of an automatic valve embodying the present improvements.
Figure 2:
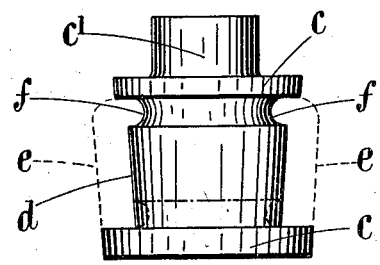
Fig. 2 is a view of the valve detached.

The casing or barrel $a$ is formed with a conical seating $b$ for the valve $c$ which is approximately in the form of a truncated cone having a rabbeted or recessed portion $d$ for receiving a ring or band $e$ of rubber or other resilient material. At or near the upper end of the rabbeted portion $d$ the valve is formed or provided with an annular groove or channel $f$ a similar annular groove or channel being provided at the lower end of the said portion $d$ if found necessary as indicated in dotted lines in the figures. Into the groove or channel or grooves or channels the inner face of the ring or band $e$ enters and engages and secures a tight seal when the valve is seated in place in the seating $b$ and leakage of air or liquid between the parts of the valve—the ring or band and the body of the valve—effectually prevented. Owing to the presence of the flange at the bottom of the valve body seating is insured and wabbling prevented. The said flange also performs the important function of preventing fluid from passing behind the rubber ring or band $e$. $a^1$ $a^2$ are lateral openings in the casing or barrel $a$ for the escape of liquid or fluid and $a^3$ is a socket adapted for application by screwing or by means of a union of any convenient or suitable form to a pipe or other device.

The valve stem $g$ is formed separately from the valve and is engaged at the lower end with the valve by means of a step bearing comprising a spigot or pin $g^1$ and a collar or flange $g^2$ which takes a bearing upon the socket projection $c^1$ the spigot or pin $g^1$ entering the recess $c^2$ formed in the upper side of the valve $c$. The upper end of the valve stem enters a recess $b$ formed in the cover $h^1$ of the casing or barrel $a$ the said stem being provided with a spring preferably a spiral spring $i$ whereby the tension of the valve is insured. This spring as shown takes a bearing at the lower end upon the collar or flange $g^2$ and at the upper end against the inner side of the cap or cover $h^1$ both the flange and the cover being provided with annular projecting rims or circular flanges $g^3$ and $h^2$ respectively for registering or keeping the spring in position. The cap or cover $h^1$ is screwed into the casing or barrel $a$ and is preferably secured by a locking ring $k$ which may be formed with faces adapted to receive a spanner for turning the same.

In order to vary or regulate the valve so as to render the same operable with different degrees of pressure it is only necessary to screw the cap $h^1$ more or less into the casing or barrel $a$ so as to vary or regulate the degree of tension of the spring $i$.

By means of the improved construction and arrangement of the parts the even working of a valve embodying the present invention is insured and leakage prevented while removal and replacement of worn or defective parts may be accomplished with ease and facility.

What I claim and desire to secure by Letters Patent of the United States is:—

An automatic valve in which the valve is of truncated conical form provided with a rabbeted or recessed portion for the reception of a ring or band of rubber or other resilient material and with an annular groove or recess at the upper end of the said rabbeted portion into which groove the said ring or band engages and in which the valve stem is formed separately from the valve and engaged therewith at the lower end by means of a step bearing of large surface and at the upper end enters a recess formed in a screw cap or cover a spring being arranged directly upon the stem between a collar on the stem the valve and the cover for enabling the desired degree of tension to be applied to the valve substantially as herein described.

EDWARD TERRY.